(12) United States Patent
Huang

(10) Patent No.: US 9,555,737 B1
(45) Date of Patent: Jan. 31, 2017

(54) THREE-IN-ONE STOP/TURN SIGNAL LIGHT

(71) Applicant: Nan Huang Huang, Rancho Palos Verdes, CA (US)

(72) Inventor: Nan Huang Huang, Rancho Palos Verdes, CA (US)

(73) Assignee: Grand General Accesories Manufacturing, Rancho Dominguez, CA (US)

( * ) Notice: Subject to any disclaimer, the term of this patent is extended or adjusted under 35 U.S.C. 154(b) by 0 days.

(21) Appl. No.: 14/619,963

(22) Filed: Feb. 11, 2015

(51) Int. Cl.
*B60Q 1/34* (2006.01)
*B60Q 1/38* (2006.01)
*B60Q 1/00* (2006.01)
*B60Q 1/44* (2006.01)

(52) U.S. Cl.
CPC ............... *B60Q 1/38* (2013.01); *B60Q 1/0041* (2013.01); *B60Q 1/444* (2013.01)

(58) Field of Classification Search
CPC .......... B60Q 1/34; B60Q 1/343; B60Q 1/387; G08G 1/08; G08B 5/30
USPC .... 340/478, 425.5, 475, 463, 309.16, 309.8, 340/477, 438, 540, 326, 458, 461, 459, 340/479, 555, 552, 384.1
See application file for complete search history.

(56) References Cited

U.S. PATENT DOCUMENTS

| | | | | |
|---|---|---|---|---|
| 5,993,015 A * | 11/1999 | Fredricks | ................ | B60R 1/02 359/839 |
| 6,067,010 A * | 5/2000 | Wang | ................ | B60Q 1/30 340/463 |
| 6,100,795 A * | 8/2000 | Otterbacher | ................ | B60D 1/36 280/477 |
| 2011/0241983 A1* | 10/2011 | Chang | ................ | G09G 3/3648 345/156 |

* cited by examiner

*Primary Examiner* — Daniel Previl
(74) *Attorney, Agent, or Firm* — Thomas I. Rozsa

(57) ABSTRACT

A stop light and turn signal lights which are incorporated into large vehicles such as a tractor trailer. A mating rear prong which is plugged into the electronics on the back of the vehicle which in turn is connected to the turn signal device usually on the steering wheel of the vehicle. The lights will first be lit on the first column of lights, then immediately the second column of lights, then immediately the third column of lights, then immediately the fourth column of lights and finally the fifth column of lights so that the device signals in a pattern from left to right that the vehicle is making a right turn or signals from right to left that the vehicle is making a left turn. When all lights are lit, it indicates a stop.

14 Claims, 12 Drawing Sheets

THREE-IN-ONE STOP/TURN SIGNAL LIGHT

BACKGROUND OF THE INVENTION

Field of the Invention

The present invention relates to the field of stop and turn signal lights that are frequently used on large vehicles such as trucks and tractor trailers.

Description of the Prior Art

To the best of the present inventor's knowledge, the present invention is totally unique and there is no prior art of which the present inventor is aware that would disclose or make obvious the present invention.

SUMMARY OF THE INVENTION

The present invention relates to stop lights and turn signal lights which are incorporated into large vehicles such as a tractor trailer. The invention incorporates an LED light design which is now incorporated into a circular taillight configuration although it will be appreciated that any other shape of taillight configuration is used with the present invention and is within the spirit and scope of the present invention. The present invention has a mating rear prong which is plugged into the electronics on the back of the vehicle which in turn is connected to the signal device usually on the steering wheel of the vehicle.

In conventional turn signal lights, there is an arrow or other marker which either has a solid electric signal or a signal which blinks on and off with an indicia marker such as an arrow that points to the left or points to the right. The present invention incorporates the use of the LED lights by having a rear light which will either emit solid light on all five columns of lights to indicate a stop or alternatively, will have a signal marker where the light will first be lit on the first column of lights, then immediately the second column of lights, then immediately the third column of lights, then immediately the fourth column of lights and finally the fifth column of lights so that the device signals in a pattern from left to right that the vehicle is making a right turn. Alternatively, the light can be turned upside down and therefore will function as a left turn signal with the same sequence however now the columns are lit going from right to left to indicate a left turn. In the event there is a stop, all the lights will remain lit for a period of time to show that the vehicle has come to a stop.

The present invention includes a unique smart chip that is affixed behind the columns of LED lights and will take its commands from the turn signal marker so that the smart chip is programmed to either have all of the lights on at one time to indicate a full stop or have the lights flash in a column, either from the left to right to indicate a right turn signal or from right to left to indicate a left turn signal. The present invention is unique in that it provides a very bright turn signal marker at the back of very large vehicles so that oncoming drivers will know whether the vehicle has come to a stop or whether the vehicle will be making a turn and in which direction the vehicle will be making the turn.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Figure 1:
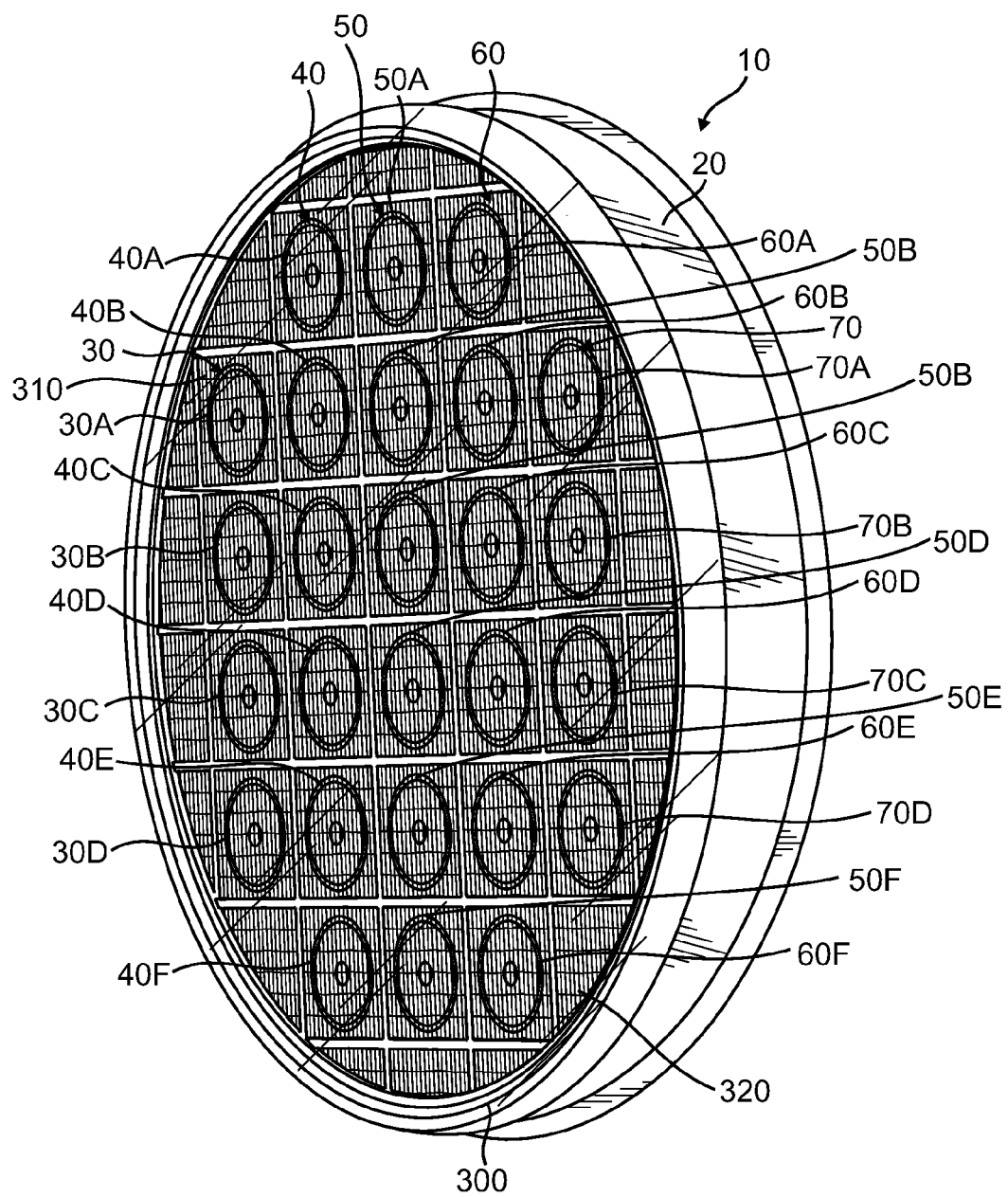
FIG. 1 is a front perspective view of the present invention three-in-one stop/turn signal light.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention involves utilizing the inventor's novel lighting system. The novel stop/turn signal lighting system is illustrated in the first eight views of FIGS. 1 through 8 showing the exterior and the components of the light. The present invention light 10 comprises a case 20 with a multiplicity of columns of lights which can be regular lights or LED lights. The first column of lights is numbered 30 and contains four lights 30A, 30B, 30C and 30D. The second column of lights is numbered 40 and comprises five columns of lights with six lights in a column including 40A, 40B, 40C, 40D. 40E and 40F. The third column of lights is numbered 50 and contains six lights in a column numbered 50A, 50B, 50C. 50D, 50E and 50F. The fourth column of lights is numbered 60 and contains six lights in a column including 60A, 60B, 60C, 60D, 60E and 60F. Finally, the last column of lights is numbered 70 and contains four lights 70A, 70B, 70C and 70D. The columns of lights are embedded in a base plate 310 within case 20, the columns of light visible through a transparent cover 320 also contained within case 20. Preferably the present invention light 10 is affixed to a left or right side of a rear wall of a vehicle, but it also within the spirit and scope of the present invention Referring to FIGS. 2 and 4, there is illustrated respectively an exploded rear perspective view and an exploded rear elevational view of the rear housing section 140 of the present invention housing 10 including a rear surface 150 having a rear mechanism which includes a plug retaining section 100 with a mating member 110 by which the plug retaining member 112 is illustrated in an exploded portion, which plug retaining member 112 in turn has female cord prong receivers 120, 130 and 140 which in turn respectively receive the three male prongs of a connection cable (not shown) which plugs into a receiving member of a turn signal mechanism in a vehicle so that the present invention three-in-one stop/turn signal light 10 is electrically connected to the turn signal mechanism (not shown) that is conventionally contained in a vehicle. The rear surface 150 also contains mounting mechanisms 160, 170, 180 and 190 by which the present invention light 10 is affixed to the vehicle wall. Preferably the present invention light 10 is affixed to the left and right rear wall surface of the vehicle although it is also within the spirit and scope of the present invention for the present invention light to be affixed to a left sidewall and a right sidewall of the vehicle adjacent the rear wall.

A key feature of the present invention is that the lights are sealed within the container 10 so a person cannot come into physical contact with the actual lights in the first column numbered 30 and the sub-lights 30A through 30D, column 40 and the sub-lights 40A through 40D, column 50 and the sub-lights 50A through 50E, column 60 and the sub-lights 60A through 60E and column 70 and the sub-lights 70A through 70E.

Figure 2:
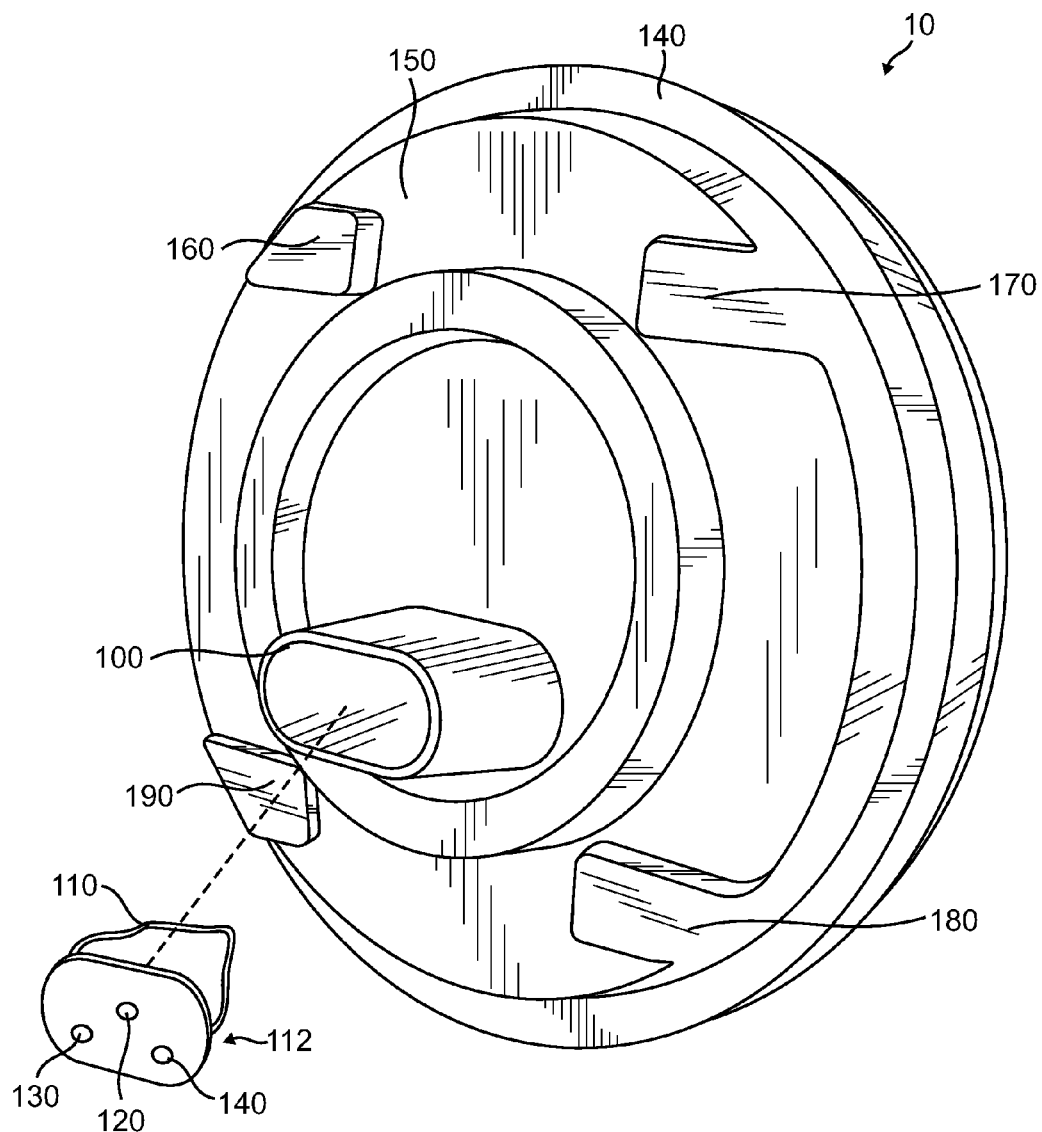
FIG. 2 is an exploded rear perspective view thereof, with the electrical inlet plug illustrated in the exploded view.
Figure 4:
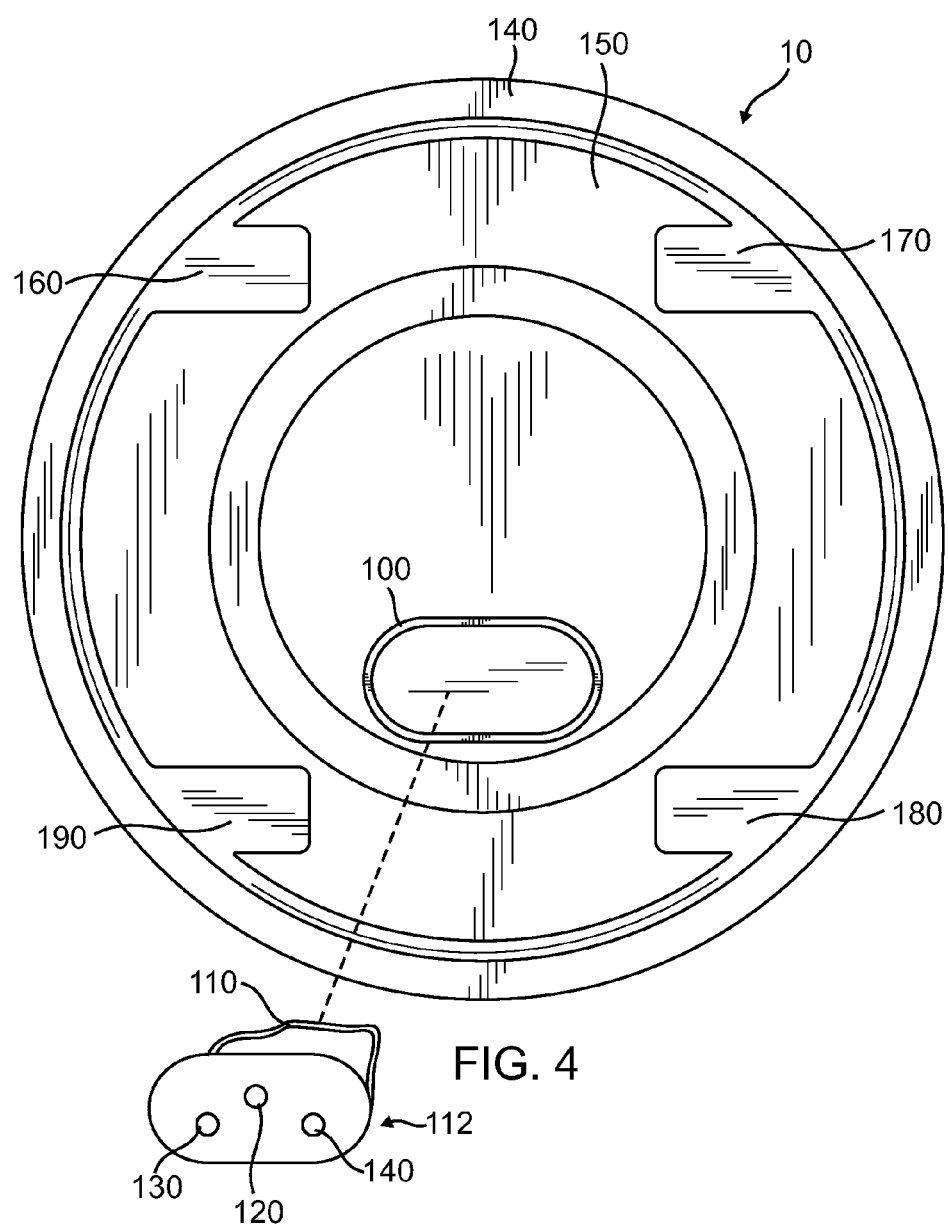
FIG. 4 is an exploded rear elevational view thereof, with the electrical inlet plug illustrated in the exploded view.
Figure 5:
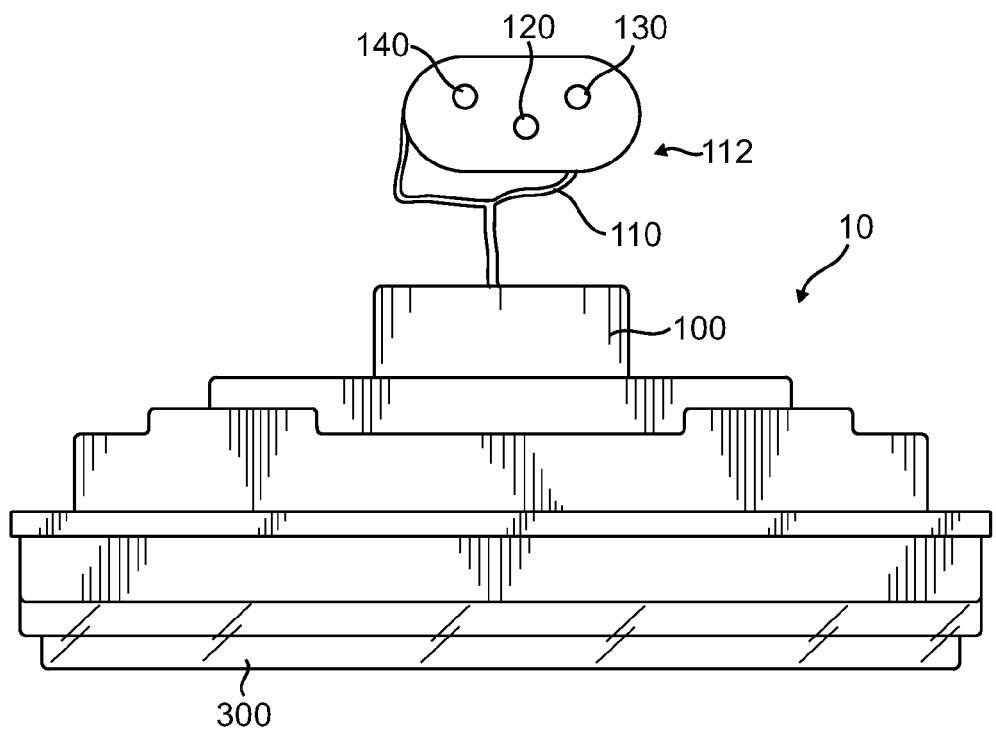
FIG. 5 is an exploded top plan view thereof, with the electrical inlet plug illustrated in the exploded view.
Figure 6:
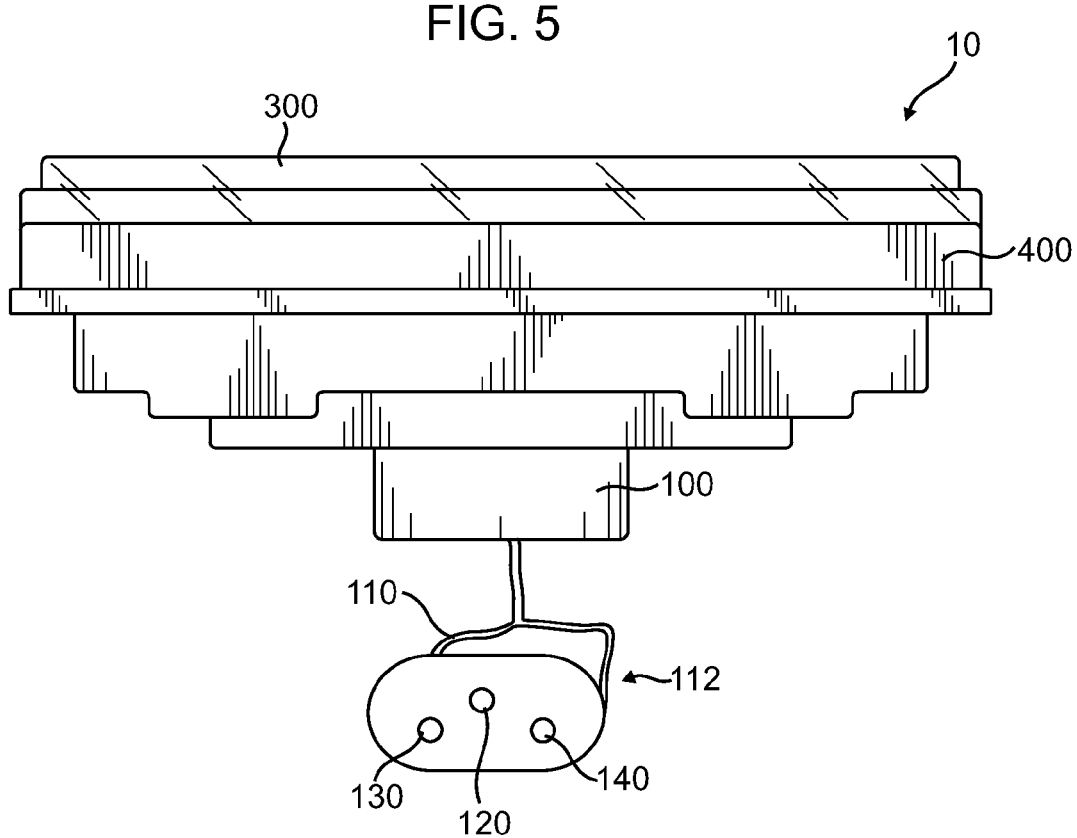
FIG. 6 is an exploded bottom plan view thereof, with the electrical inlet plug illustrated in the exploded view.
Figure 7:
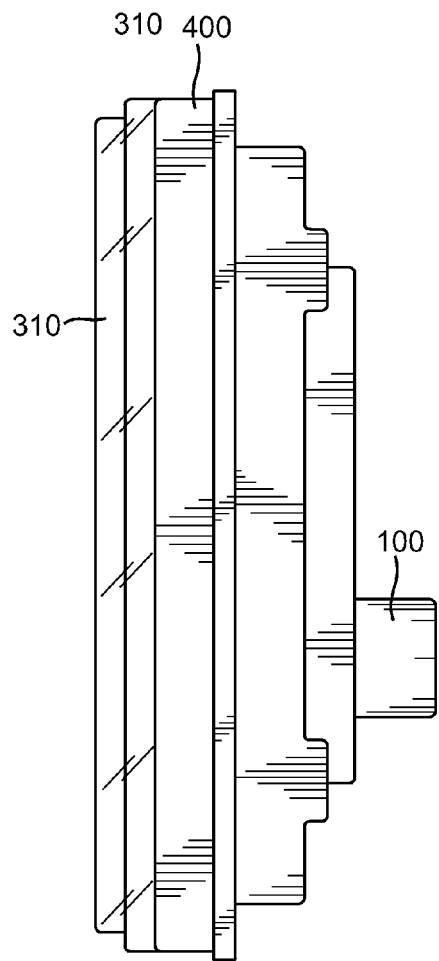
FIG. 7 is a right side elevational view thereof.
Figure 8:
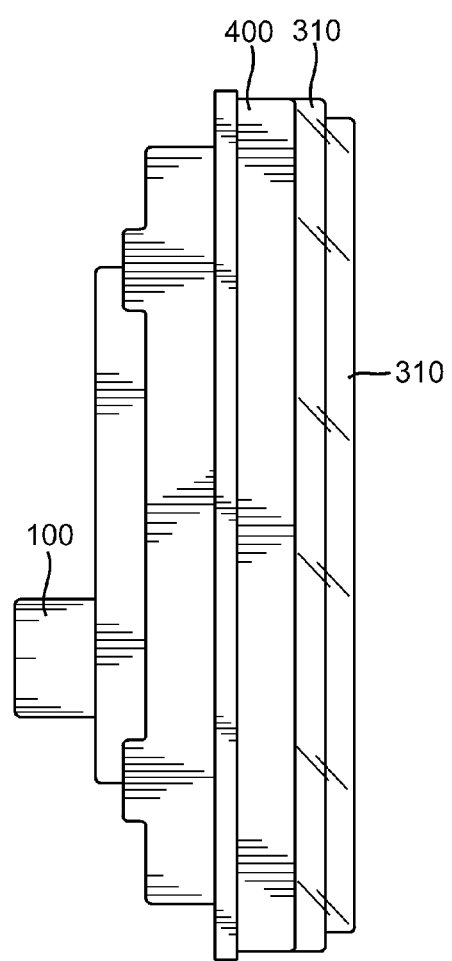
FIG. 8 is a left side elevational view thereof.

FIG. 5 is an exploded top plan view of the present invention light 10 with the plug retaining member 112 and its components as illustrated in FIGS. 2 and 4 in the exploded position. FIG. 6 is an exploded bottom plan view of the present invention light 10 with the plug retaining member 112 and its components as illustrated in FIGS. 2 and 4 in the exploded position. FIG. 7 is a right side elevational view of the present invention light 10 and FIG. 8 is a left side elevational view of the present invention light 10.

Figure 3:
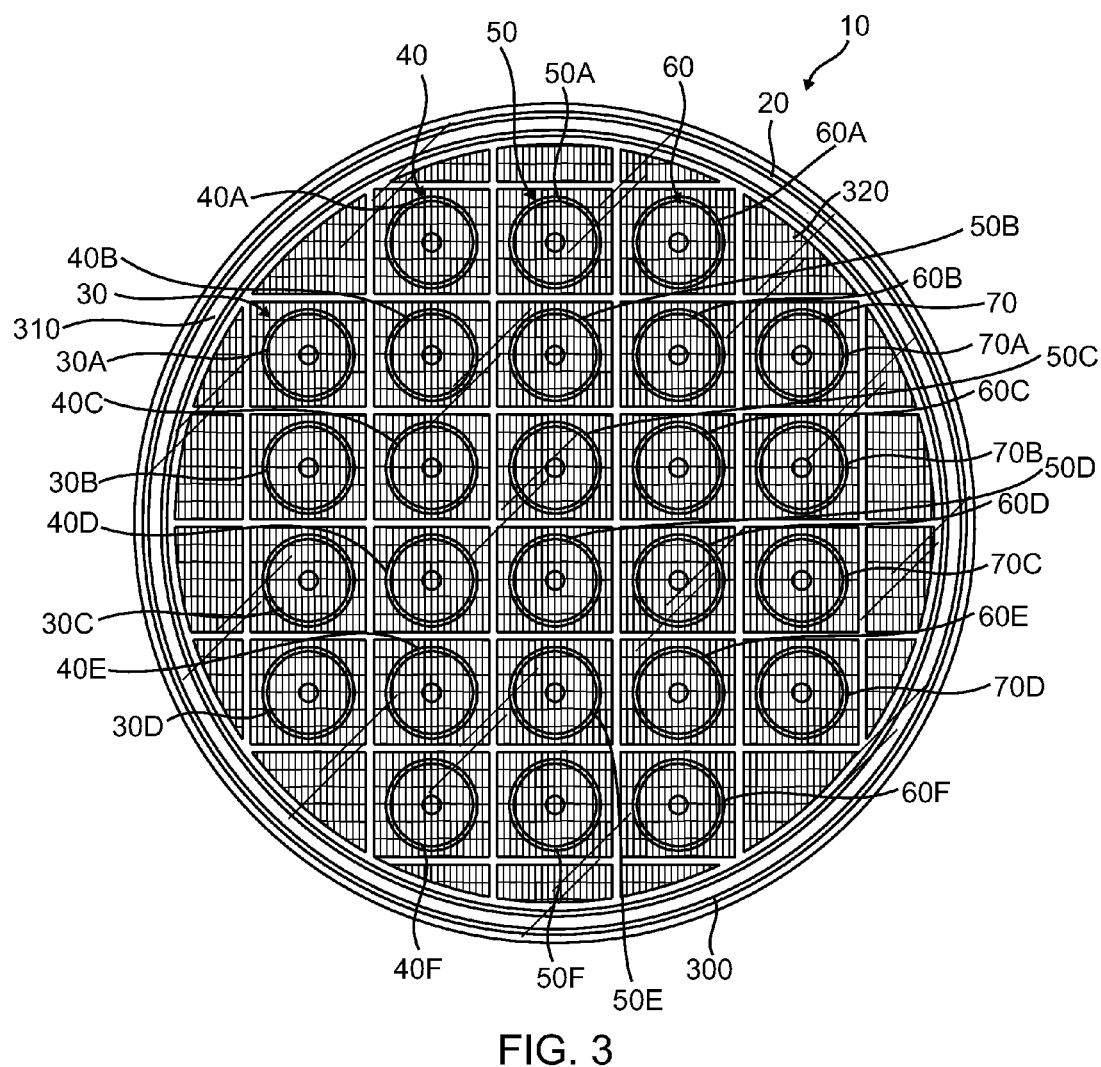
FIG. 3 is a front elevational view thereof.

FIG. 3 is a front elevational view of the present invention light 10 with the light columns 30, 40, 50, 60 and 70 electrically embedded in an electrical plate 310 and covered by a transparent cover 320, the light columns and electrical plate covered with a transparent cover 320 all within a front body 300.

Figure 8A:
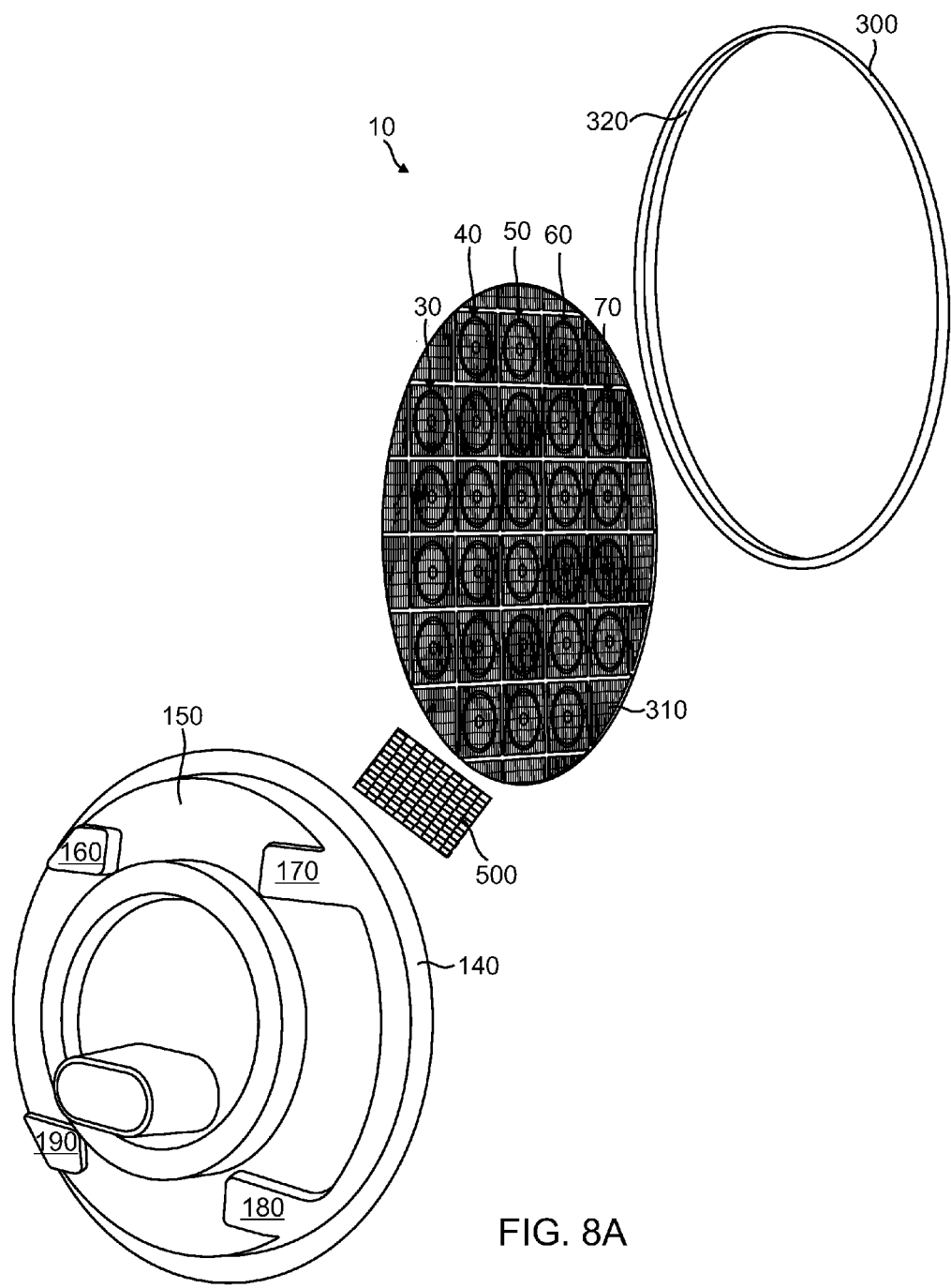
FIG. 8A is an exploded view thereof.

Referring to FIG. 8A there is illustrated an exploded view of the present invention light 10 with a smart chip 500 which is electronically connected to the series of lights with each respective light column 30, 40, 50, 60 and 70 electrically embedded in an electrical plate 310 and covered by a transparent cover 320 all within a front body section 300 and also houses the electronics in smart chip 500.

Figure 9:
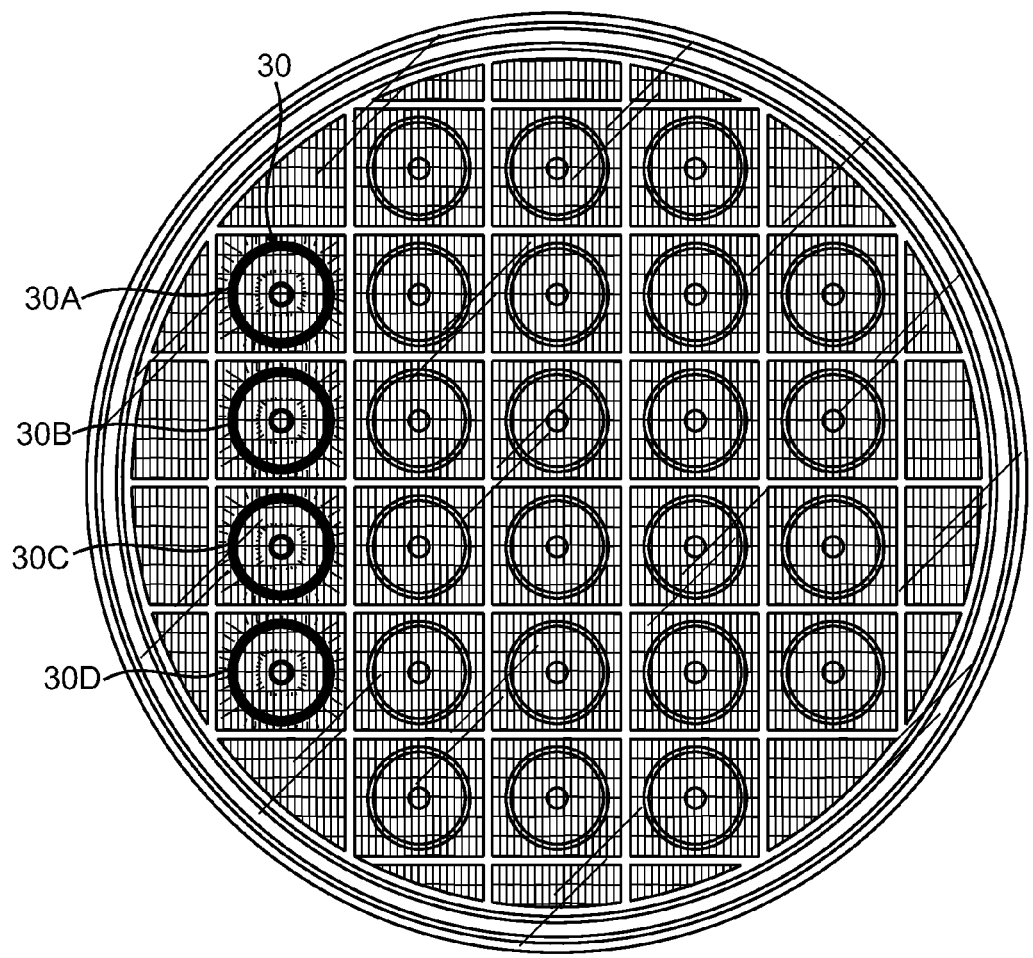
FIG. 9 is a front view thereof with the first column of lights on the left side illuminated.
Figure 10:
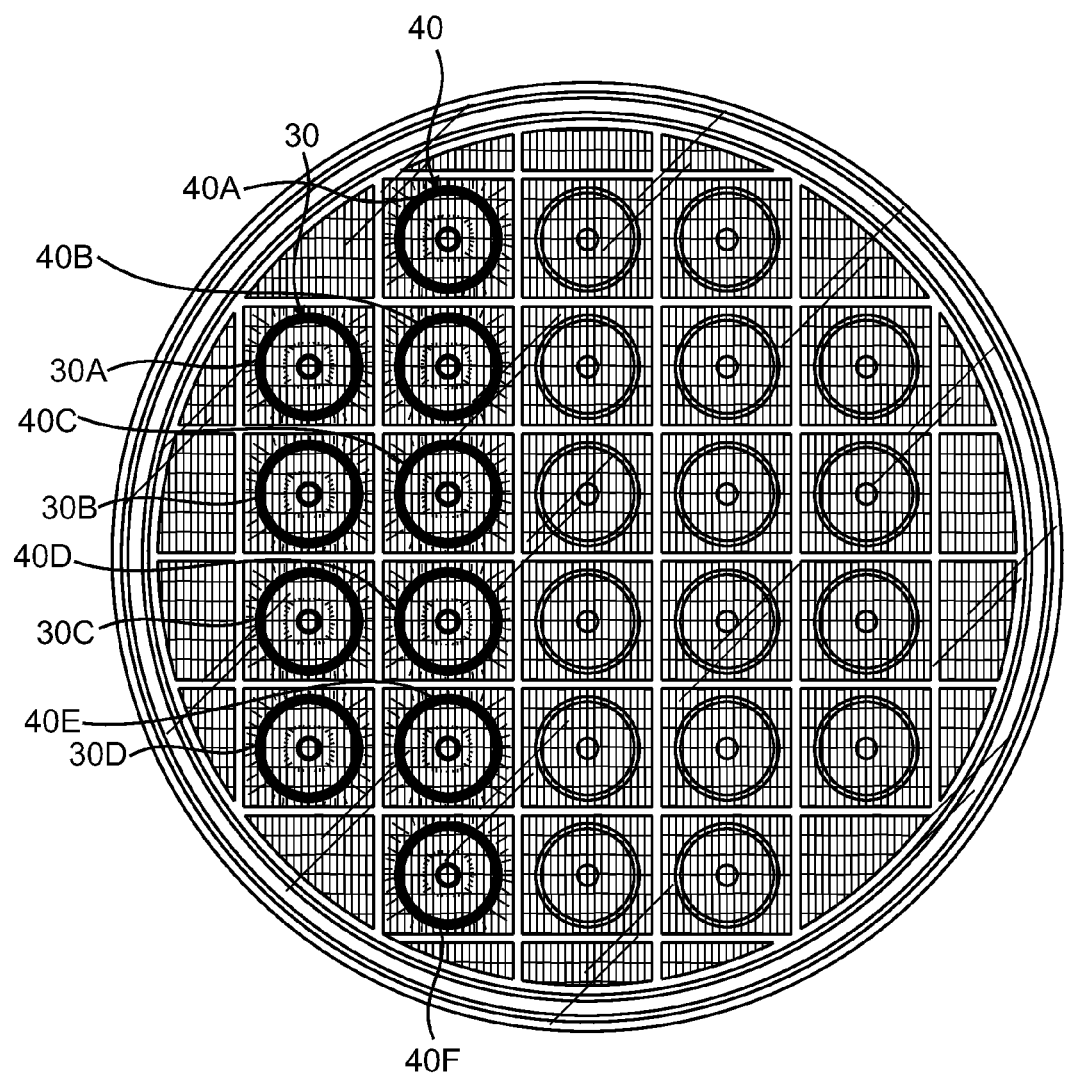
FIG. 10 is a front view thereof with both the first and second columns of lights illuminated.
Figure 11:
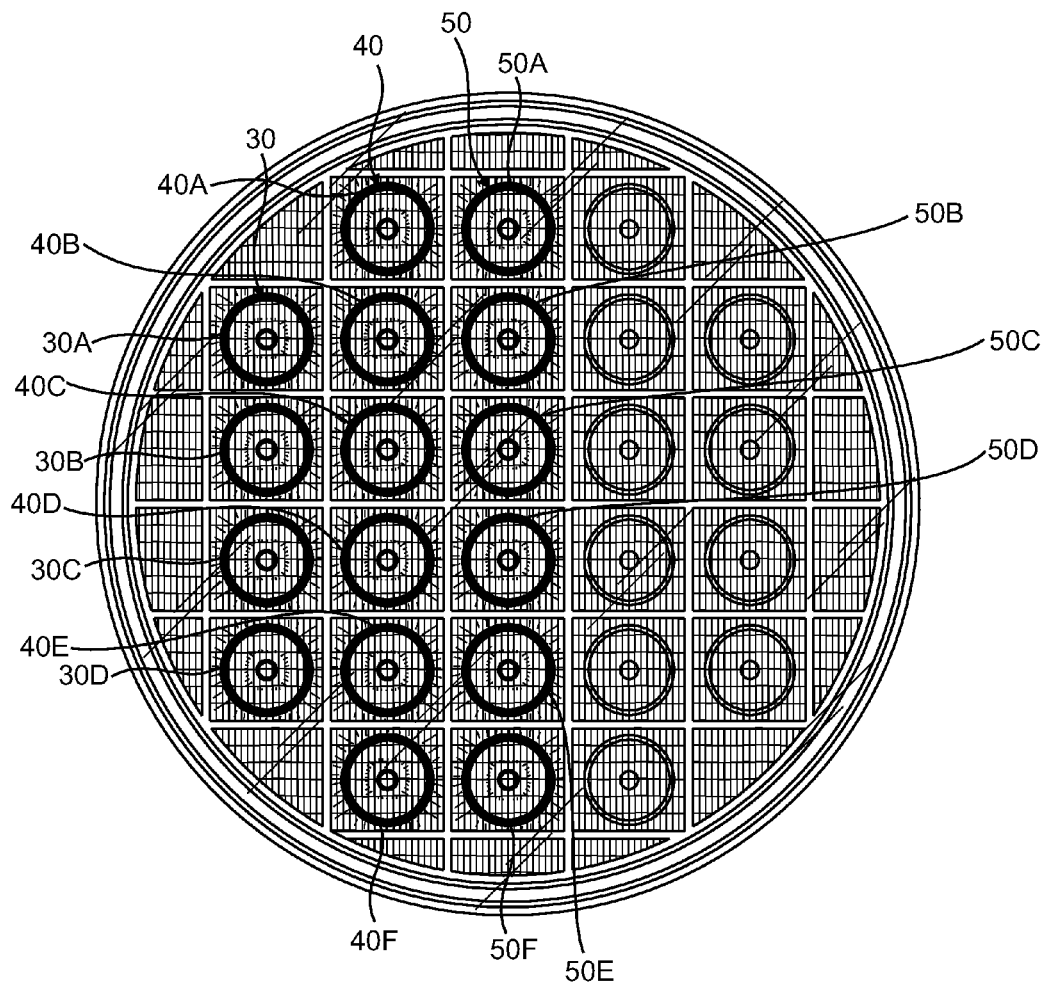
FIG. 11 is a front elevational view thereof with three vertical columns from left to right illuminated.

The uniqueness of the present invention is that it can indicate a full stop or can indicate a turn by a flashing sequential series of lights going from left to right and from right to left. With respect to making a right turn, when the turn signal mechanism is moved to the right turn signal, the first column of lights 30 and sub-lights 30A, 30B, 30C and 30D shown in series of lights shown in FIG. 9 are illuminated while the remaining lights are not illuminated. In the next sequence, the second column of lights which are 40 and sub-lights 40A, 40B, 40C, 40D and 40E are illuminated. Therefore, the first two columns of lights are illuminated while the remaining lights are not illuminated. In the third step shown in FIG. 11, the first three columns of lights 30, 40 and 50 and sub-lights 30A, 30B, 30C and 30D, 40A, 40B, 40C, 40D and 40E and 50A, 50B, 50C, 50D and 50E are illuminated and the remaining lights are not illuminated.

Figure 12:
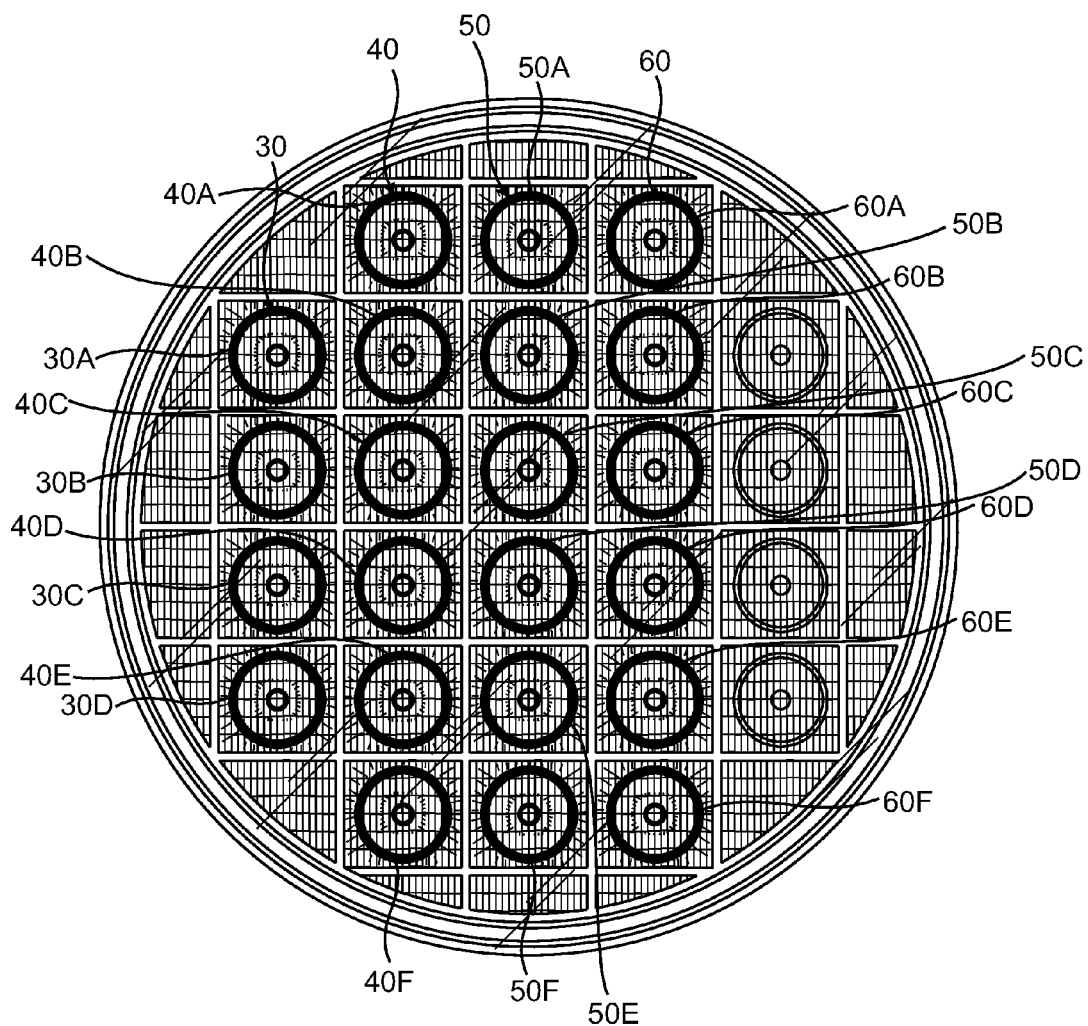
FIG. 12 is a front view thereof with the four columns from left to right illuminated.

Referring to FIG. 12, the first four columns of lights 30, 40, 50 and 60 and sub-lights 30A, 30B, 30C and 30D, 40A, 40B, 40C, 40D, 40E and 50A, 50B, 50C, 50D and 50E and 60A, 60B, 60C, 60D and 60E are illuminated and the last column is not illuminated.

Figure 13:
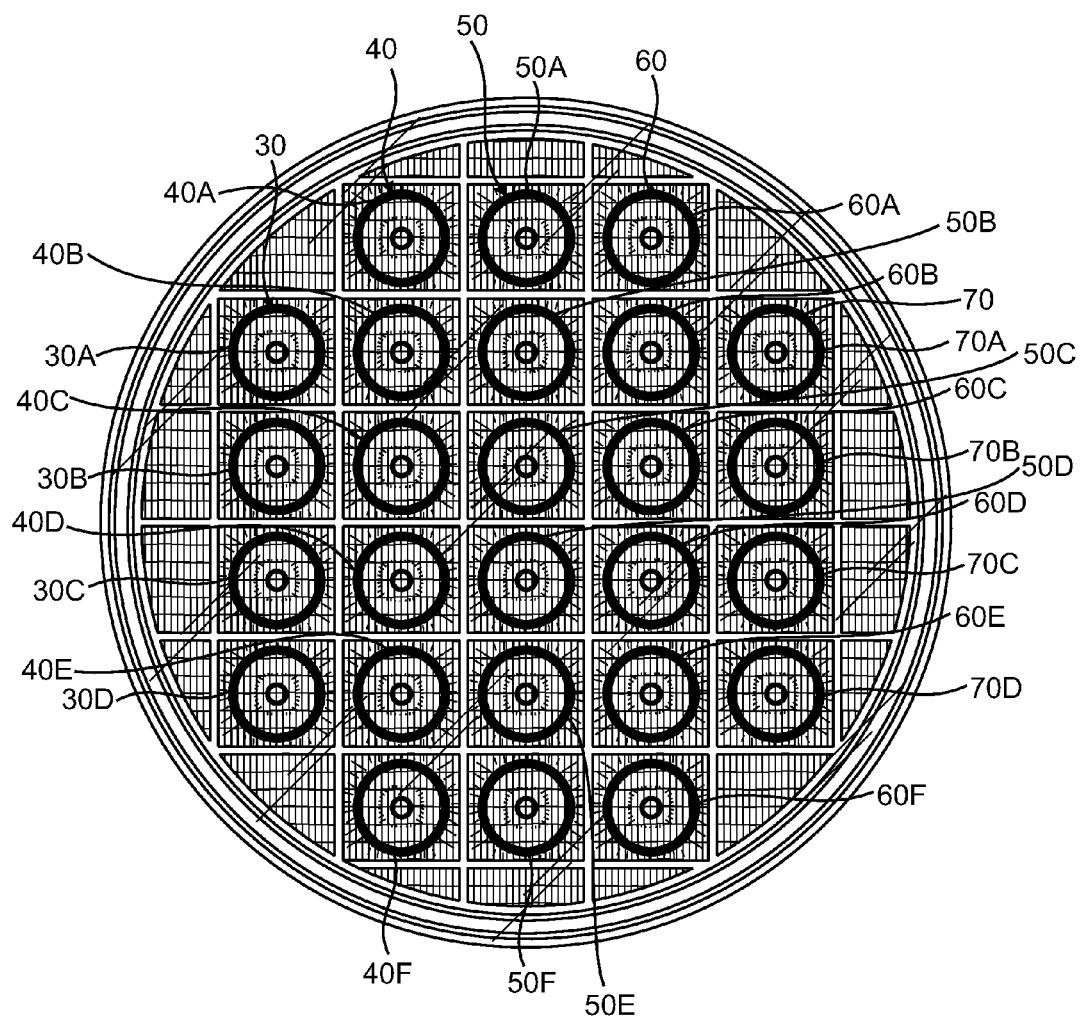
FIG. 13 is a front view thereof with all five columns of lights illuminated.

Referring to FIG. 13, the fifth column of lights 70 and sub-lights 70A, 70B, 70C and 70D are illuminated along with the other lights as just described.

It will be appreciated that each column is illuminated sequentially and once the first column is illuminated, the next sequential column is illuminated and stays illuminated, then the third sequential column is illuminated and stays illuminated, then the fourth sequential column is illuminated and stays illuminated and the fifth sequential column is illuminated. Every time one column is illuminated, when the second column adjacent it is illuminated, the column immediately prior to that column stays illuminated. Therefore, while it is a sequential set of illuminations, the columns illuminate in the direction of the turn. With respect to the figures illustrated, it is illustrating a right turn with the columns illuminated from left to right. It will be appreciated that to have a left turn, the exact same assembly is affixed to the left rear surface of the vehicle but it is turned upside down so that the illumination sequence of each respective series of lights in column 30, column 40, column 50, column 60 and column 70 are sequentially illuminated as described above going from right to left indicating a left turn. Also, if the vehicle comes to a full stop, the turn signal is moved to a stop position and all five columns and each light in each column 30, 40, 50, 60 and 70 are illuminated comparable to the image indicated shown in FIG. 13.

While 5 rows of lights have been disclosed with separately aligned lights in the first and fifth row and three separately aligned lights in the second, third and fourth rows, it will be appreciated that it within the spirit and scope of the present invention to include having at least three rows of lights with any multiplicity of separately aligned lights in each respective one of the at least three rows of lights.

Therefore, the present invention involves a unique, highly visible turn signal and stop light that is on the back of large vehicles such as trucks, big rigs etc. so that oncoming other vehicles which would include any type of land vehicle including, but not limited to, trucks, big rigs, cars, motorcycles etc. can clearly see that the truck is coming to a stop or that the truck is going to be making either a right turn or a left turn based upon the signal markers. Therefore, through use of the present invention, the single device with the smart chip 500 enables a driver of the truck to safely come to a stop or safely indicate that the vehicle that the driver is driving is making a left turn or making a right turn.

The housings 300 and 140 are made of plastic or compounds of plastic.

Therefore, the present invention incorporates a very unique three-in-one stop/turn signal.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A stop/turn signal light used in conjunction with a vehicle, the stop/turn signal light comprising:
   a. a case with a multiplicity of aligned columns of individual lights in each column;
   b. a first column having four aligned separate lights, a second column adjacent the first column and having five aligned separate lights;
   c. a third column adjacent to the second column and having five aligned separate lights;
   d. a fourth column adjacent the third column and having five aligned separate lights;
   e. a fifth column adjacent the fourth column and having four aligned separate lights;
   f. the case of the stop/turn signal light having a rear casing portion including a rear surface including members by which the stop/turn signal light is affixed to a surface of the vehicle, the rear surface including prong receiving members receiving prongs of a cable connected to a stop/turn signal member in the vehicle;
   g. the first column, the second column, the third column, the fourth column and the fifth column and each respective aligned separate lights in each respective column embedded in and electrically connected to an electric plate and the electric plate electrically connected to a smart chip which provides illumination commands for each aligned separate light in each respective column to be sequentially illuminated, the aligned separate lights in each respective row visible through a transparent cover, the smart chip, electric plate and transparent cover sealed in a first portion of the case;
   h. the smart chip enabling all lights in the first column of lights, all lights in the second column of lights, all lights in the third column of lights, all lights in the fourth column of lights and all lights in the fifth column of lights to be illuminated at the same time to illuminate a stop signal when stop/turn signal member is moved to a stop position; and
   i. the smart chip enabling the first column with aligned separate lights to be illuminated and sequentially the second column with aligned separate lights to be illuminated and sequentially the third column of aligned separate lights to be illuminated and sequentially the fourth column of aligned separate lights to be illuminated and sequentially the fifth column of aligned separate lights to be illuminated in a repetitive sequential manner when the stop/turn signal member is moved to a turn signal position.

2. The stop/turn signal light in accordance with claim 1, further comprising the case is in a first position and affixed to a right location on the vehicle and the smart chip illuminates the lights sequentially from the first column of separate lights to the second column of separate lights to the third column of separate lights to the fourth column of separate lights to the fifth column of separate lights to indicate a right turn signal when the stop/turn signal member is moved to a right turn signal position.

3. The stop/turn signal light in accordance with claim 2, further comprising the rear surface of the casing is affixed to the vehicle at a location selected from the group consisting of adjacent a right rear surface of the vehicle and adjacent a right side surface of the vehicle.

4. The top/turn signal light in accordance with claim 1, further comprising the case is in a second position which is turned 180 degrees from the first position and affixed to a left location on the vehicle and the smart chip illuminates the lights sequentially from the first column of aligned separate lights to the second column of aligned separate lights to the third column of aligned separate lights to the fourth column of aligned separate lights to the fifth column of aligned separate lights to indicate a left turn signal when the stop/turn member is moved to a left turn signal position.

5. The stop/turn signal light in accordance with claim 4, further comprising the rear surface of the casing is affixed to the vehicle at a location selected from the group consisting of adjacent a left rear surface of the vehicle and adjacent a left side surface of the vehicle.

6. The stop/turned signal light in accordance with claim 1, further comprising: the casing is made of material selected from the group consisting of plastic and plastic compound.

7. The stop/turn signal light in accordance with claim 1, further comprising each aligned separate lights selected from the group consisting of LED lights and conventional lights.

8. The top/turn signal light in accordance with claim 1, further comprising the light case is in a second position which is turned 180 degrees from the first position and affixed to a left location on the vehicle and the smart chip illuminates the lights sequentially from the from the first column of a multiplicity of separately aligned lights to the second column of a multiplicity of separately aligned lights to the third column of a multiplicity of separately aligned lights indicate a left turn signal when the stop/turn member is moved to a left turn signal position.

9. The stop/turn signal light in accordance with claim 8, further comprising the rear surface of the casing is affixed to the vehicle at a location selected from the group consisting of adjacent a left rear surface of the vehicle and adjacent a left side surface of the vehicle.

10. A stop/turn signal light used in conjunction with a vehicle, the stop/turn signal light comprising:
    a. a case with at three aligned columns of individual lights in each of the at least three aligned columns;
    b. a first column having a multiplicity of aligned separate lights, a second column adjacent the first column and having a multiplicity of vertically aligned separate lights;
    c. a third column adjacent to the second column and having a multiplicity of vertically aligned separate lights;
    d. the case of the stop/turn signal light having a rear casing portion including a rear surface including members by which the stop/turn signal light is affixed to a surface of the vehicle, the rear surface including prong receiving members receiving prongs of a cable connected to a stop/turn signal member in the vehicle;
    e. the first column, the second column, and the third column, and each respective vertically aligned lights in each respective column embedded in and electrically connected to an electric plate and the electric plate electrically connected to a smart chip which provides illumination commands for each aligned light in each respective column to be sequentially illuminated, the aligned multiplicity of separate lights in each respective row visible through a transparent cover, the smart chip, electric plate and transparent cover sealed in a first portion of a casing;
    f. the smart chip enabling all lights in the first column of lights, all lights in the second column of lights, all lights in the third column of lights, to be illuminated at the same time to illuminate a stop signal when stop/signal member is moved to a stop position; and g. the smart chip enabling the first column with a multiplicity of separately aligned lights to be illuminated and sequentially the second column with a multiplicity of separately aligned lights to be illuminated and sequentially the third column with a multiplicity of separately aligned lights to be illuminated, in a repetitive sequential manner when the stop/turn signal member is moved to a turn signal position.

11. The stop/turn signal light in accordance with claim 10, further comprising the light case is in a first position and affixed to a right location on the vehicle and the smart chip illuminates the lights sequentially from the first column of a multiplicity of separately aligned lights to the second column of a multiplicity of separately aligned lights to the third column of a multiplicity of separately lights to indicate a right turn signal when the stop/turn member is moved to a right turn signal position.

12. The stop/turn signal light in accordance with claim 11, further comprising the rear surface of the casing is affixed to the vehicle at a location selected from the group consisting of adjacent a right rear surface of the vehicle and adjacent a right side surface of the vehicle.

13. The stop/turned signal light in accordance with claim 10, further comprising: the casing is made of material selected from the group consisting of plastic and plastic compounds.

14. The stop/turn signal light in accordance with claim 10, further comprising each of the multiplicity of separately aligned lights is selected from the group consisting LED lights or a conventional lights.

* * * * *